United States Patent [19]

Goretta et al.

[11] 4,196,272

[45] * Apr. 1, 1980

[54] CONTINUOUS PROCESS FOR THE PREPARATION OF AN ACRYLIC ACID-METHYL ACRYLATE COPOLYMER IN A TUBULAR REACTOR

[75] Inventors: Louis A. Goretta, Naperville; Robert R. Otremba, Chicago, both of Ill.

[73] Assignee: Nalco Chemical Company, Oak Brook, Ill.

[ * ] Notice: The portion of the term of this patent subsequent to Mar. 6, 1996, has been disclaimed.

[21] Appl. No.: 964,213

[22] Filed: Nov. 27, 1978

[51] Int. Cl.$^2$ .......................................... C08F 220/06
[52] U.S. Cl. ........................................ 526/64; 526/213; 526/214; 526/222; 526/229; 526/240; 526/317
[58] Field of Search ................. 526/64, 213, 214, 222, 526/229, 240, 317

[56] References Cited

U.S. PATENT DOCUMENTS

| | | | |
|---|---|---|---|
| 3,035,033 | 5/1962 | Schweitzer et al. | 526/64 |
| 3,234,303 | 2/1966 | Bild et al. | 526/64 |
| 3,388,109 | 6/1968 | Hawkins et al. | 526/214 |
| 3,658,772 | 4/1972 | Volk et al. | 526/303 |
| 3,661,827 | 5/1972 | Taft | 526/317 |
| 3,677,991 | 7/1972 | Moore | 526/317 |
| 3,753,958 | 8/1973 | Wingler et al. | 526/317 |
| 3,817,946 | 6/1974 | Ree | 526/214 |
| 3,872,063 | 3/1975 | Kim | 526/303 |
| 3,929,739 | 12/1975 | Barabas et al. | 526/303 |
| 4,110,521 | 8/1978 | Barnett et al. | 526/64 |
| 4,143,222 | 3/1979 | Goretta et al. | 526/64 |

FOREIGN PATENT DOCUMENTS 678892  1/1964  Canada ................................. 526/317

*Primary Examiner*—John Kight, III
*Attorney, Agent, or Firm*—John G. Premo; Robert A. Miller

[57] ABSTRACT

A continuous process for the preparation of water-soluble copolymers of vinyl carboxylic acids and lower alkyl acrylates is disclosed. The process employs a tubular reactor and polymerizes the monomers in aqueous solution in the presence of a free radical catalyst. Molecular weights of from 3,000–300,000 and preferably from about 5,000–25,000 are obtained utilizing this process.

8 Claims, No Drawings

CONTINUOUS PROCESS FOR THE PREPARATION OF AN ACRYLIC ACID-METHYL ACRYLATE COPOLYMER IN A TUBULAR REACTOR

INTRODUCTION

Water soluble vinyl carboxylic acid-lower alkyl acrylate copolymers are used in many different industrial applications. They are useful as flocculating agents, agents for improving the fine and filler retention in papermaking operations, as scale inhibitors, as corrosion inhibitors and as thickneining and dispersing agents. In certain applications such as boiler scale control and dispersing agents for aqueous systems, it is desirable that the copolymers be of relatively low molecular weight, e.g. 3,000–300,000 and most preferably, about 5,000–25,000.

Vinyl carboxylic acid-lower alkyl acrylate copolymers are most often polymerized using batch processes with the monomers being polymerized in dilute aqueous solutions. In other instances, the comonomers may be polymerized using a water-in-oil emulsion technique, e.g. see Vanderhoff, U.S. Pat. No. 3,284,393. When solution polymerizations or emulsion polymerizations are used as a technique for producing low molecular weight polymers, it is oftentimes difficult to control the molecular weight of the finished copolymers so that it stays below 300,000. This is so even when chain transfer agents such as thioglycolic acid are used. Unless great care is taken, the resultant copolymers will oftentimes have excessively high molecular weights which render them unsatisfactory for certain industrial applications of the type previously discussed.

If it were possible to control the molecular weight of vinyl carboxylic acid-lower alkyl acrylate copolymers within the range of 3,000–300,000, and preferably between 5,000 and 25,000 so that these copolymers could be readily produced without significant molecular weight variation occurring, an advance in the art of polymerization would be afforded.

Also of benefit would be a polymerization method and system for producing vinyl carboxylic acid-lower alkyl acrylate copolymers which are continuous, simple to operate, and utilized simple inexpensive equipment.

THE INVENTION

In accordance with the invention, there is provided an improved method for controlling the molecular weight of vinyl carboxylic acid-lower alkyl acrylate copolymers within the range of 3,000–300,000 and preferably, within the range of 10,000–25,000. The vinyl carboxylic acids which are copolymerized with the lower alkyl acrylate are represented by the following formula:

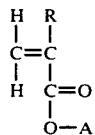

wherein R is H or CH$_3$ and A is selected from the group consisting of hydrogen, alkali metal or ammonium ions. A preferred vinyl carboxylic acid is acrylic acid and its alkali metal salts.

The lower alkyl acrylates which are utilized in this invention are selected from the group consisting of methyl acrylate and ethyl acrylate. Although higher alkyl groups can be utilized, water-solubility is a criteria of this invention and the two species listed above have been found to have greater utility in this sense. The preferred lower alkyl acrylate is methyl acrylate.

The method of this invention comprises the steps of polymerizing aqueous solutions of the vinyl carboxylic acid and lower alkyl acrylate as defined above continuously in a tube reactor at a pressure of between 50–350 pounds per square inch gauge (psig) in the presence of a free radical catalyst. Sufficient pressure should be maintained in the tube reactor of this invention to maintain the reactants in a liquid state. By keeping the reaction conditions listed below within the limits specified, it is possible to carefully control the molecular weight of the aqueous copolymers which are produced continuously in aqueous solution.

| | |
|---|---|
| I. Monomer solids | 20–50% by weight; |
| II. Initiation temperature | 80–180° F. |
| III. Monomer pH | 1–6.0 |
| IV. Initiator concentration | 2.0–12.0 by weight (based on monomer) |
| V. Vinyl carboxylic acid-lower alkyl acrylate weight ratio | 60/40–95/5 |
| VI. Residence time | 1–24 minutes; |

The term, free radical catalyst, includes a wide variety of free radical catalysts. The preferred free radical catalysts used in the practice of the invention are the so-called redox catalysts which usually are a blend of a water-soluble persulfate and a water-soluble bisulfite. Less desirable free radical catalysts that may be used in the practice of the invention are the well-known hydroperoxides and the so-called azo catalysts such as azobisisobutyronitrile.

While monomer solids have been specified above to be from 20–50%, it has been found in the practice of this invention that sometimes levels of 50% monomer solids will produce a solution which is too viscous to satisfactorily handle in the continuous tube reactor. As a result, monomer solids levels of from 20–40% and most preferably from 20–32% are preferred.

With regard to the initiation temperature specified as 80°–180° F. above, this figure can be manipulated to produce different molecular weight materials. By increasing the temperature, lower molecular weight materials will be prepared. By decreasing the initiation temperature within the above range, higher molecular weight materials will be prepared.

While we have specified an acidic pH value for the monomer solution over a range of 1.0–6.0, oftentimes it will be necessary to operate within the range 1–5 to avoid the preparation of a monomer solution having two phases. With regards to initiator concentration, this figure also will determine the molecular weight of the finished polymer with higher levels of initiator are utilized to produce a lower molecular weight material.

The ratio of vinyl carboxylic acid to lower alkyl acrylate as seen above can vary. Preferably, this ratio will be from 70:30 to 90:10 and most preferably will be approximately 80:20. As will be seen, however, it is only important that the monomer ratio chosen produces a polymer which will be water-soluble and within the molecular weight ranges discussed. While an initiation temperature is specified, it will be readily apparent to those skilled in the art that after initiation the temperature may rise considerably. Temperatures as high as 400° F. can be expected due to the rapid polymerization called for in this invention and as a result, pressure must be employed to keep the reactants in a liquid state. The residence time of the monomer solution after initiation in the continuous reactor of this invention can also vary greatly. We have found, however, that generally the residence time will be from 1–24 minutes although this time can vary substantially depending upon the equipment employed.

One of the numerous advantages of the instant continuous process is in the fact that chain transfer agents such as thioglycolic acid and/or glycolic acids do not have to be employed to control the molecular weight of the finished polymer solution. This is beneficial due to the fact that these materials oftentimes have strong odors which it is desirable to avoid and the fact that the chain transfer with the ultimate application to which the polymer is put. It should be pointed out, however, that the process of this invention will perform either with or without chain transfer agents.

As will be shown hereinafter, all of the examples were performed in a 40" long, ¾" i.d. tubular reactor packed with glass beads to limit reactor volume. While the reaction conditions given specifically relate to that particular reactor, those skilled in the art will readily understand that when larger scale reactors are utilized, minor corresponding changes in these variables will have to be employed. As an example, in larger reactors where there would be less corresponding heat loss, it may be desirable to operate at a slightly lower temperature than that specified so as to more easily control the reaction. It is to be pointed out that we do not wish to be limited to the specific sized reactor which is discussed in the examples since it is readily apparent that the process described can be scaled up to much larger sized reactors using the parameters indicated.

To illustrate the many advantages of the invention, the following is presented by way of example:

EXAMPLE 1

| Monomer Feed Solution | Amount |
|---|---|
| Chicago tap water | 1311 g |
| 50% NaOH solution | 515 g |
| Glacial acrylic acid | 927 g |
| methyl acrylate | |
| (pH of solution 5.0) | 247 g |
| Catalyst Solution No. 1 | |
| Chicago tap water | 355 g |
| Ammonium persulfate | 45.0 g |
| Catalyst Solution No. 2 | |
| Chicago tap water | 665 g |
| Sodium bisulfite | 135 g |

The above solutions would illustrate a typical acrylic acid-methyl acrylate copolymer formulation. These solutions can be used to describe the technique involved with the continuous polymerization in a tub reactor.

The tube reactor consists of a stainless steel (No. 316) pipe, ¾" in internal diameter and 40" in length. The tube was packed with glass beads, 3–4 mm in diameter and had a void volume of 150 cc.

Lapp pulsa-feeder pumps were used for the monomer feed and catalyst solutions. For the above solutions, the following pumping rates were maintained.

Monomer Feed Solution—34.5 cc/minute
Catalyst Solution No. 1—3.0 cc/minute
Catalyst Solution No. 2—6.0 cc/minute Before beginning an actual polymerization run, the back pressure regulator was pressurized with nitrogen. The pressure could be varied from 50–350 psig or higher depending on the anticipated temperature rise during the polymerization. Generally, a pressure in the range of 150–250 psig was found to be more than adequate for most of the experimental work. This back pressure was necessary in order to maintain a liquid phase during the polymerization reaction when temperatures would exceed the boiling point of water.

The run is begun when monomer feed and catalyst pumps are turned on simultaneously. When this occurs, the monomer feed solution is being pumped through a pre-heat section consisting of a 10 ft. coil of ¼" stainless steel (No. 316) tubing immersed in an oil bath set at a predetermined temperature. The pre-heater enables the monomer solution to be raised to the desired initiation temperature. As the monomer solution leaves the pre-heater, it immediately enters the static mixer at the same time that catalyst solutions No. 1 and 2 are being pumped into the system. The combined solutions enter the static mixer where an initimate mixing occurs. Some initiation may begin at this time. However, as the combined solutions enter the packed tube, the major portion of the polymerization reaction will occur and run to completion. This tube reactor section was covered with insulation to ensure adiabaticity. On the basis of the pumping rates previously described, the polymer solution has a 3.5 minute residence time in this reactor section. When the polymer solution leaves the reactor, the conversion should be high and the reaction completed.

Upon leaving the reactor, the polymer solution was cooled to room temperature in the chiller section. The chiller consisted of a 10 ft. of ¼" stainless steel (No. 316) tubing immersed in a cold water bath.

After the chiller, the final product was collected as an aqueous polymer solution.

Utilizing the above procedure, the reactor was pressurized to 250 pounds per square inch gauge with nitrogen gas. The monomer solution was heated to a temperature of 171° F. and after being combined with the catalyst prior to entry into the tube was 190° F. During the reaction, the maximum temperature rose in the tube to approximately 319° F., approximately 10 inches up the tube. The resultant material had a molecular weight of approximately 19,000.

Using the above procedure, a variety of tests varying various reactions conditions were performed and the results are set forth below.

TABLE I

| Example | Initiator[1] Concentration (Percent) | Initiation Temperature (°F.) | Molecular Weight | % Residual Monomer[2] Acrylic Acid | Methyl Acrylate |
|---|---|---|---|---|---|
| 1 | 10 | 180 | 19,000 | 0.4 | 0.2 |
| 2 | 20 | 180 | 9,400 | 0.2 | 0.05 |
| 3 | 30 | 180 | 5,900 | 0.2 | 0.15 |
| 4 | 20 | 160 | 10,000 | 0.6 | 0.5 |
| 5 | 20 | 140 | 8,900 | — | — |
| 6 | 10 | 140 | 21,000 | — | — |
| 7 | 20 | 100 | 7,100 | — | — |
| 8 | 10 | 100 | 24,000 | — | — |

[1] 3 parts sodium bisulfite to 1 part ammonium persulfate
[2] Based on polymer solids

TABLE II

EFFECT OF THIOGLYCOLIC ACID (TGA) AND INITIATION TEMPERATURE ON THE RESULTING MOLECULAR WEIGHT AND RESIDUAL MONOMER OF ACRYLIC ACID-METHYL ACRYLATE COPOLYMERS

| | | Process Variables | | | | | | Responses | | | | | |
|---|---|---|---|---|---|---|---|---|---|---|---|---|---|
| | | | | | | | | | | | | Residual Monomer[2] | |
| Example | Monomer Composition | Monomer Concentration (Percent) | Monomer pH | Initiator Composition[1] | Initiator Concentration (Percent) | Initiation Temperature (°F.) | Chain Transfer Agent | ΔT (°F.) | pH | Intrinsic Viscosity | Molecular Weight | Acrylic Acid | Methyl Acrylate |
| 9 | 80% Acrylic Acid-20% Methyl Acrylate | 31 | 2.0 | APS | 4.0 | 180 | None | 173 | 1.2 | 0.640 | 120,000 | 1.7 | 1.3 |
| 10 | 80% Acrylic Acid-20% Methyl Acrylate | 31 | 2.1 | APS | 5.3 | 180 | TGA | 126 | 1.6 | 0.0717 | 4,300 | 23.5 | 15.8 |
| 11 | 80% Acrylic Acid-20% Methyl Acrylate | 31 | 2.1 | APS | 5.3 | 100 | TGA | 50.5 | — | 0.130 | 11,000 | 0.6 | 0.03 |
| 12 | 80% Acrylic Acid-20% Methyl Acrylate | 31 | 2.0 | 3SBS:1APS | 10.0 | 180 | TGA | 0 | 2.1 | 0.0855 | 5,600 | 29 | 32 |
| 13 | 80% Acrylic Acid-20% Methyl Acrylate | 31 | 2.1 | APS | 5.3 | 180 | GA[3] | 204 | — | 0.563 | 97,000 | 7.8 | 0.9 |

[1]APS = Ammonium Persulfate. SBS = Sodium Bisulfate
[2]Percent Based on Polymer Solids
[3]Glycolic Acid

TABLE III

SUMMARY OF MOLECULAR WEIGHT AND RESIDUAL MONOMER ON VARYING THE RATIO OF ACRYLIC ACID TO METHYL ACRYLATE IN MONOMER SOLUTION

| | | Process Variables | | | | | Responses | | | | |
|---|---|---|---|---|---|---|---|---|---|---|---|
| | | | | | | | | | | Residual Monomer[2] | |
| Example | Monomer Composition | Monomer Concentration (Percent) | Monomer pH | Initiator Composition[1] | Initiator Concentration (Percent) | Initiation Temperature (°F.) | ΔT (°F.) | pH | Molecular Weight | Acrylic Acid | Methyl Acrylate |
| 14 | 70% Acrylic Acid-30% Methyl Acrylate | 31 | 2.1 | 3SBS:1APS | 20 | 180 | 145 | — | 8,800 | 0.28 | <0.03 |
| 15 | 80% Acrylic Acid-20% Methyl Acrylate | 31 | 2.1 | 3SBS:1APS | 20 | 180 | 155 | 2.2 | 9,400 | 0.2 | 0.05 |
| 16 | 90% Acrylic Acid-10% Methyl Acrylate | 31 | 2.1 | 3SBS:1APS | 20 | 180 | 160 | — | 12,000 | 0.58 | 0.03 |

[1]APS = Ammonium Persulfate. SBS = Sodium Bisulfate
[2]Percent Based on Polymer Solids

TABLE IV

SUMMARY OF MOLECULAR WEIGHT AND RESIDUAL MONOMER RESULTING FROM VARYING THE pH OF MONOMER SOLUTION

| | | Process Variables | | | | | Responses | | | | |
|---|---|---|---|---|---|---|---|---|---|---|---|
| | | | | | | | | | | Residual Monomer[2] | |
| Example | Monomer Composition | Monomer Concentration (Percent) | Monomer pH | Initiator Composition[1] | Initiator Concentration (Percent) | Initiation Temperature (°F.) | ΔT (°F.) | pH | Molecular Weight | Acrylic Acid | Methyl Acrylate |
| 17 | 80% Acrylic Acid-20% Methyl Acrylate | 31 | 2.1 | 3SBS:1APS | 10 | 180 | 160 | 1.9 | 19,000 | 0.4 | 0.2 |
| 18 | 80% Acrylic Acid-20% Methyl Acrylate | 31 | 4.5 | 3SBS:1APS | 10 | 180 | 140 | 4.9 | 14,000 | 3.3 | 1.5 |
| 19 | 80% Acrylic Acid-20% Methyl Acrylate | 31 | 5.9 | 3SBS:1APS | 10 | 180 | Phase Separation of Monomer (Methyl Acrylate) | | | | |

[1]APS = Ammonium Persulfate. SBS = Sodium Bisulfate
[2]Percent Based on Polymer Solids

TABLE V

SUMMARY OF MOLECULAR WEIGHT AND RESIDUAL MONOMER RESULTING FROM CHANGES IN INITIATOR[1] CONCENTRATION

| | | Process Variables | | | | | Responses | | | | |
|---|---|---|---|---|---|---|---|---|---|---|---|
| | | | | | | | | | | Residual Monomer[2] | |
| Example | Monomer Composition | Monomer Concentration (Percent) | Monomer pH | Initiator Composition[1] | Initiator Concentration (Percent) | Initiation Temperature (°F.) | ΔT (°F.) | pH | Molecular Weight | Acrylic Acid | Methyl Acrylate |
| 20 | 80% Acrylic Acid- | | | | | | | | | | |

TABLE V-continued
SUMMARY OF MOLECULAR WEIGHT AND RESIDUAL MONOMER RESULTING FROM CHANGES IN INITIATOR[1] CONCENTRATION

| | | Process Variables | | | | | Responses | | | Residual Monomer[2] | |
|---|---|---|---|---|---|---|---|---|---|---|---|
| Example | Monomer Composition | Monomer Concentration (Percent) | Monomer pH | Initiator Composition[1] | Initiator Concentration (Percent) | Initiation Temperature (°F.) | ΔT (°F.) | pH | Molecular Weight | Acrylic Acid | Methyl Acrylate |
| 15 | 80% Acrylic Acid-20% Methyl Acrylate | 31 | 2.1 | 3SBS:1APS | 10 | 180 | 160 | 1.9 | 19,000 | 0.4 | 0.2 |
| 22 | 80% Acrylic Acid-20% Methyl Acrylate | 31 | 2.1 | 3SBS:1APS | 20 | 180 | 155 | 2.2 | 9,400 | 0.2 | 0.05 |
|    | 80% Acrylic Acid-20% Methyl Acrylate | 31 | 2.2 | 3SBS:1APS | 30 | 180 | 141 | 2.2 | 5,900 | 0.2 | 0.15 |

[1]APS = Ammonium Persulfate. SBS = Sodium Bisulfite
[2]Percent Based on Polymer Solids

TABLE VI
EFFECT OF INITIATION TEMPERATURE ON THE MOLECULAR WEIGHT AND RESIDUAL MONOMER OF ACRYLIC ACID-METHYL ACRYLATE COPOLYMERS

| | | Process Variables | | | | | Responses | | | Residual Monomer[2] | |
|---|---|---|---|---|---|---|---|---|---|---|---|
| Example | Monomer Composition | Monomer Concentration (Percent) | Monomer pH | Initiator Composition[1] | Initiator Concentration (Percent) | Initiation Temperature (°F.) | ΔT (°F.) | pH | Molecular Weight | Acrylic Acid | Methyl Acrylate |
| 23 | 80% Acrylic Acid-20% Methyl Acrylate | 31 | 2.1 | 3SBS-1APS | 10 | 100 | 157 | — | 24,000 | 0.13 | <0.03 |
| 24 | 80% Acrylic Acid-20% Methyl Acrylate | 31 | 2.1 | 3SBS-1APS | 10 | 140 | 166 | — | 21,000 | 0.75 | <0.03 |
| 20 | 80% Acrylic Acid-20% Methyl Acrylate | 31 | 2.1 | 3SBS-1APS | 10 | 180 | 160 | 1.9 | 19,000 | 0.4 | 0.2 |
| 26 | 80% Acrylic Acid-20% Methyl Acrylate | 31 | 2.1 | 3SBS-1APS | 20 | 100 | 170 | — | 7,100 | 0.33 | <0.03 |
| 27 | 80% Acrylic Acid-20% Methyl Acrylate | 31 | 2.1 | 3SBS-1APS | 20 | 160 | 163 | — | 10,000 | 0.6 | 0.5 |
| 15 | 80% Acrylic Acid-20% Methyl Acrylate | 31 | 2.1 | 3SBS-1APS | 20 | 180 | 155 | 2.2 | 9,400 | 0.2 | 0.05 |

[1]APS = Ammonium Persulfate. SBS = Sodium Bisulfite
[2]Percent Based on Polymer Solids

TABLE VII
COMPARISON OF MOLECULAR WEIGHT AND RESIDUAL MONOMER ON METHYL AND ETHYL ACRYLATE POLYMERS PREPARED AT VARIOUS PROCESSING CONDITIONS

| | | Process Variables | | | | | Responses | | | Residual Monomer[2] | |
|---|---|---|---|---|---|---|---|---|---|---|---|
| Example | Monomer Composition | Monomer Concentration (Percent) | Monomer pH | Initiator Composition[1] | Initiator Concentration (Percent) | Initiation Temperature (°F.) | ΔT (°F.) | pH | Molecular Weight | Acrylic Acid | Methyl Acrylate |
| 20 | 80% Acrylic Acid-20% Methyl Acrylate | 31 | 2.1 | 3SBS:1APS | 10 | 180 | 160 | 1.9 | 19,000 | 0.4 | 0.2 |
| 30 | 80% Acrylic Acid-20% Ethyl Acrylate | 31 | — | 3SBS:1APS | 10 | 180 | 133 | 1.9 | 23,000 | 1.4 | <0.2 |
| 15 | 80% Acrylic Acid-20% Methyl Acrylate | 31 | 2.1 | 3SBS:1APS | 20 | 180 | 155 | 2.2 | 9,400 | 0.2 | 0.05 |
| 32 | 80% Acrylic Acid-20% Ethyl Acrylate | 31 | — | 3SBS:1APS | 20 | 180 | 151 | 1.7 | 9,400 | 0.5 | <0.2 |
| 33 | 80% Acrylic Acid-20% Methyl Acrylate | 31 | 2.1 | 3SBS:1APS | 20 | 140 | 172 | — | 8,900 | 0.02 | <0.03 |
| 34 | 80% Acrylic Acid-20% Ethyl Acrylate | 31 | — | 3SBS:1APS | 20 | 140 | 181 | 1.8 | 9,500 | 0.7 | <0.2 |
| 24 | 80% Acrylic Acid-20% Methyl Acrylate | 31 | 2.1 | 3SBS:1APS | 10 | 140 | 166 | — | 21,000 | 0.75 | <0.03 |
| 36 | 80% Acrylic Acid-20% Ethyl Acrylate | 31 | — | 3SBS:1APS | 10 | 140 | 170 | 1.9 | 22,000 | 0.9 | <0.2 |

[1]SBS = Sodium Bisulfite. APS = Ammonium Persulfate
[2]Percent Based on Polymer Solids It is apparent from the above that the molecular weight of any particular copolymer can be varied by changing one or more of the above described reaction parameters. By selecting the particular parameter to be changed, it is possible to control with extreme accuracy the molecular weight of the finished copolymer.

Having thus described our invention, it is claimed as follows:

1. A method for preparing copolymers of vinyl carboxylic acids and lower alkyl acrylates selected from the group consisting of methyl acrylate and ethyl acrylate, said vinyl carboxylic acids having the formula prior to polymerization:

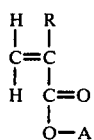

wherein R is H or $CH_3$ and A is selected from the group consisting of hydrogen, ammonium or alkali metal ions, said method comprising the steps of polymerizing an aqueous solution of the vinyl carboxylic acid with said lower alkyl acrylate in a tube reactor at a pressure of between 50–350 psig, said pressure being sufficient to maintain the reactants in a liquid state in the presence of a free radical catalyst while maintaining the conditions of the reaction within the limits set forth below:

| | | |
|---|---|---|
| I. | Monomer solids | 20–50% by weight |
| II. | Initiation temperature (°F.) | 80–180° F. |
| III. | Monomer pH | 1.0–6.0 |
| IV. | Initiator concentration | 2.0–12% by weight (based on monomer) |
| V. | Vinyl carboxylic acid-lower alkyl acrylate weight ratio | 60/40–95/5 |
| VI. | Residence time | 1–15 minutes | said copolymer of vinyl carboxylic acid and lower alkyl acrylate having a molecular weight of from 3,000–300,000.

2. The method of claim 1 wherein the free radical catalyst is a redox catalyst and the pressure of the reactor is within the range of 150–200 psig.

3. The method of claim 1 wherein the molecular weight of the vinyl carboxylic acid-lower alkyl acrylate copolymer is 10,000–25,000.

4. The method of claim 1 wherein R is hydrogen.

5. The method of claim 1 wherein R is hydrogen and A is sodium.

6. The method of claim 1 wherein the lower alkyl acrylate is methyl acrylate, the vinyl carboxylic acid is acrylic acid and the ratio of acrylic acid to methyl acrylate is approximately 80:20.

7. The method of claim 1 wherein the free radical catalyst is ammonium persulfate.

8. The method of claim 1 wherein a claim transfer agent selected from the group of thioglycolic acid and glycolic acid is utilized.

* * * * *